United States Patent
Bernard et al.

[19]

[11] Patent Number: 6,020,727
[45] Date of Patent: Feb. 1, 2000

[54] SETTING OF A LINEAR REGULATOR TO STAND-BY

[75] Inventors: Christophe Bernard, Bourg d'Oisans; Régis Miquel, Grenoble, both of France

[73] Assignee: SGS-Thomson Microelectronics S.A., Saint Genis, France

[21] Appl. No.: 08/964,964

[22] Filed: Nov. 5, 1997

[30] Foreign Application Priority Data

Nov. 8, 1996 [FR] France .................................. 96 13914

[51] Int. Cl.[7] .................................................. G05F 1/40
[52] U.S. Cl. ...................................................... 323/269
[58] Field of Search ................................ 323/225, 267, 323/268, 269

[56] References Cited

U.S. PATENT DOCUMENTS

| | | | |
|---|---|---|---|
| 4,609,982 | 9/1986 | Gohda | 363/89 |
| 5,142,219 | 8/1992 | Hsu et al. | 323/314 |
| 5,189,316 | 2/1993 | Murakami et al. | 323/314 |
| 5,341,085 | 8/1994 | Ettes | 323/222 |
| 5,375,247 | 12/1994 | Hueser | 395/750 |

FOREIGN PATENT DOCUMENTS

| | | | |
|---|---|---|---|
| 0 544 362 | 6/1993 | European Pat. Off. | G05F 1/46 |
| WO-A-94 12921 | 6/1994 | WIPO | G05F 1/40 |

*Primary Examiner*—Shawn Riley
*Attorney, Agent, or Firm*—Wolf, Greenfield & Sacks, P.C.

[57] ABSTRACT

The present invention relates to a linear regulator of a voltage for supplying a load, including circuitry for setting to partial stand-by the regulator as a response to a control signal supplied by the load setting of a linear regulator to stand-by the regulator in response to a control signal supplied by the load.

12 Claims, 1 Drawing Sheet

SETTING OF A LINEAR REGULATOR TO STAND-BY

BACKGROUND OF THE INVENTION

1. Field of the Invention

The present invention relates to a linear voltage regulator for supplying a load while maintaining the voltage across the load at a predetermined value. The present invention more specifically applies to a voltage regulator for supplying, by means of a battery, a mobile device. In particular, the present invention applies to a voltage regulator for supplying a mobile telephone from a rechargeable battery.

2. Discussion of the Related Art

FIG. 1 shows an example of conventional diagram of a positive voltage linear regulator circuit.

Such a regulator essentially includes an amplifier 1 for controlling a power element 2 meant to supply a load 3 under a predetermined voltage Vout. An input terminal E of the regulator is connected to a rechargeable battery 4 for supplying the power required for the supplying of load 3 connected to an output terminal S of the regulator. Power element 2 is generally formed of a MOS transistor, for example, a P-channel transistor, for minimizing, with respect to the use of a bipolar transistor, the so-called waste voltage, that is, the voltage drop between terminals E and S of the regulator. The source of transistor 2 is connected to terminal E while its drain forms terminal S. A decoupling capacitor C is generally connected between terminal S and the ground. Amplifier 1 includes a first inverting input connected to a terminal R of the regulator to which is applied a reference voltage Vref. A second non-inverting input of amplifier 1 is connected to terminal S. An output of amplifier 1 is connected to the gate of transistor 2 to modify, according to the error voltage between the inverting and non-inverting inputs, the gate-source voltage of transistor 2 and thus maintain voltage Vout at reference value Vref. It is possible to have a resistive dividing bridge (not shown) interposed between terminal S and the inverting input of amplifier 1 to introduce a constant coefficient of proportionality between voltages Vref and Vout.

If the regulator is meant for supplying a mobile device from a rechargeable battery, it is desirable for the regulator to have the lowest possible power consumption to improve the charge hold duration of the battery. Further, the regulator must then have a waste voltage which is the lowest possible which depends, in particular, on the drain source resistance in the on-state of the transistor.

A disadvantage of a regulator such as shown in FIG. 1 is that the power consumption by the regulator is substantially constant despite changes in the current consumed by load 3. For example, in an application to mobile phones, where the current surge for the regulator is about one hundred milliamperes during a communication and from about 100 $\mu$A to a few mA while waiting for a communication, the power consumption of a conventional regulator is about 200 $\mu$A.

To reduce the power consumption of the regulator when the load only requires a low current, a self-biased amplifier 1, the biasing current of which adapts according to the load, is generally used. If such a solution enables making the consumption of the regulator variable according to the load, this consumption remains high (for example, about 100 $\mu$A) for a low output current. Indeed, if the power consumption of amplifier 1 decreases, the resistance of the output stage (generally formed of a MOS transistor) of amplifier 1 increases, which causes a lowering of the cut-off frequency linked to the gate capacitance of MOS power transistor 2. Indeed, transistor 2 generally is a transistor of significant size, that is, having a high ratio W/L (gate width over length) and thus has a high gate capacitance. Thus, if it is attempted to decrease the power consumption of the amplifier caused by its self-biasing too much, the circuit becomes unstable since the pole connected to the gate capacitor of transistor 2 becomes neighbor to that connected to decoupling capacitor C. To make the loop stable, the different poles always have to be distant from one another. A solution consists of multiplying the number of stages, but the power consumption is then increased.

The problem of stability is particularly critical in a linear regulator because, differently from other power converters of switched-mode supply type where the reverse feedback controlling the output voltage is discontinuous, the reverse feedback loop in a linear regulator is permanent.

A compromise thus has to be made between the decrease of the consumption of amplifier 1 for a low output current and the stability of this regulator. Referring to the above example of a mobile phone, this results, in practice, in a minimum current consumption of about 100 $\mu$A for the regulator.

It would be desirable to further decrease this minimum consumption to improve the charge hold duration of battery 4.

SUMMARY OF THE INVENTION

The present invention aims at providing a new linear regulator having a very low consumption during periods of low current surge by the load while maintaining the stability of the regulator.

To achieve this and other objects, the present invention provides a linear regulator of a voltage for supplying a load, including means for setting to partial stand-by the regulator in response to a control signal supplied by the load.

According to an embodiment of the present invention, the regulator includes a first linear conduction element for supplying the load outside partial stand-by periods, and at least one second linear conduction element for supplying the load during partial stand-by periods, each conduction element being associated with a means for controlling the supply voltage of the load on a predetermined reference voltage.

According to an embodiment of the present invention, each conduction element is formed of a MOS transistor, a first MOS power transistor associated with a full charge mode exhibiting a gate width/length ratio that is much higher than the gate width/length ratio of a second transistor.

According to an embodiment of the present invention, the means for controlling the conduction elements are formed of a differential amplifier including, in cascade, an input differential stage receiving the reference voltage and the supply voltage of the load, a first output branch, a terminal of which is connected to a control terminal of the second conductive element, and a second output branch, a terminal of which is connected, via an impedance adapter, to a control terminal of the first conductive element.

According to an embodiment of the present invention, the regulator includes switching means, controlled by the control signal supplied by the load, for biasing the second branch of the control amplifier and the impedance adapter associated with the first conductive element only during full charge periods.

According to an embodiment of the present invention, the regulator further includes a switching means, associated with each conductive element and controlled by the control signal, for blocking one of the two conductive elements according to the operating mode.

According to an embodiment of the present invention, the control means of the first conductive element is formed of a differential amplifier receiving the reference voltage and the supply voltage of the load and a first output stage of which is meant for the first conductive element.

According to an embodiment of the present invention, the control means of the second conductive element is formed of the differential amplifier, a second output stage of which is meant for the second conductive element.

These objects, characteristics and advantages as well as others, of the present invention, will be discussed in detail in the following non-limiting description of specific embodiments of the present invention, in relation with the accompanying drawings.

DETAILED DESCRIPTION

Figure 1:
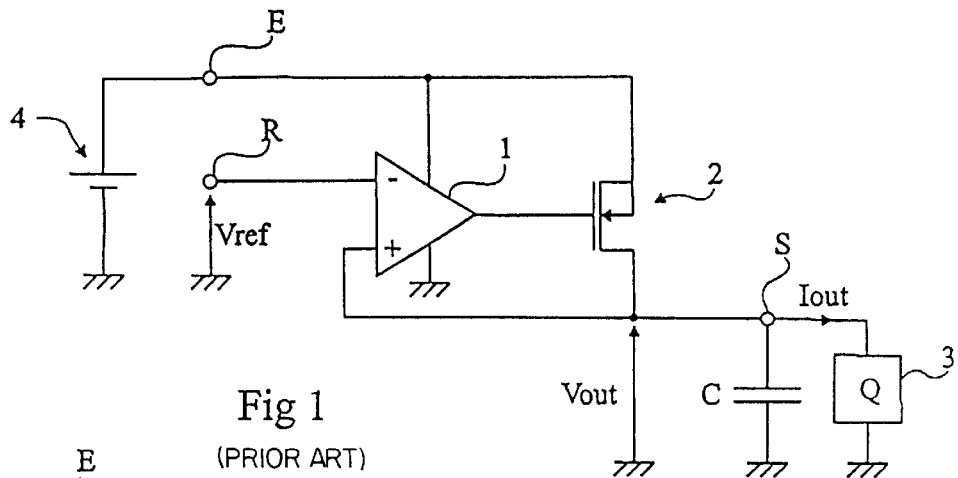
FIG. 1, previously described, is meant to show the state of the art and the problem to solve.

The same elements have been referred to with the same references in the different drawings. For clarity, only those elements of the regulator which are necessary to the understanding of the present invention have been shown in the drawings.

A characteristic of the present invention is to provide a regulator having at least two distinct operating modes to adapt to a load having itself at least two operating modes which differ by different current surge ranges.

Thus, the present invention provides a regulator operating in a so-called "full charge" mode when supply of the load requires a significant current and a so-called "partial stand-by" operating mode when supply of the load requires a substantially lower current.

Figure 2:
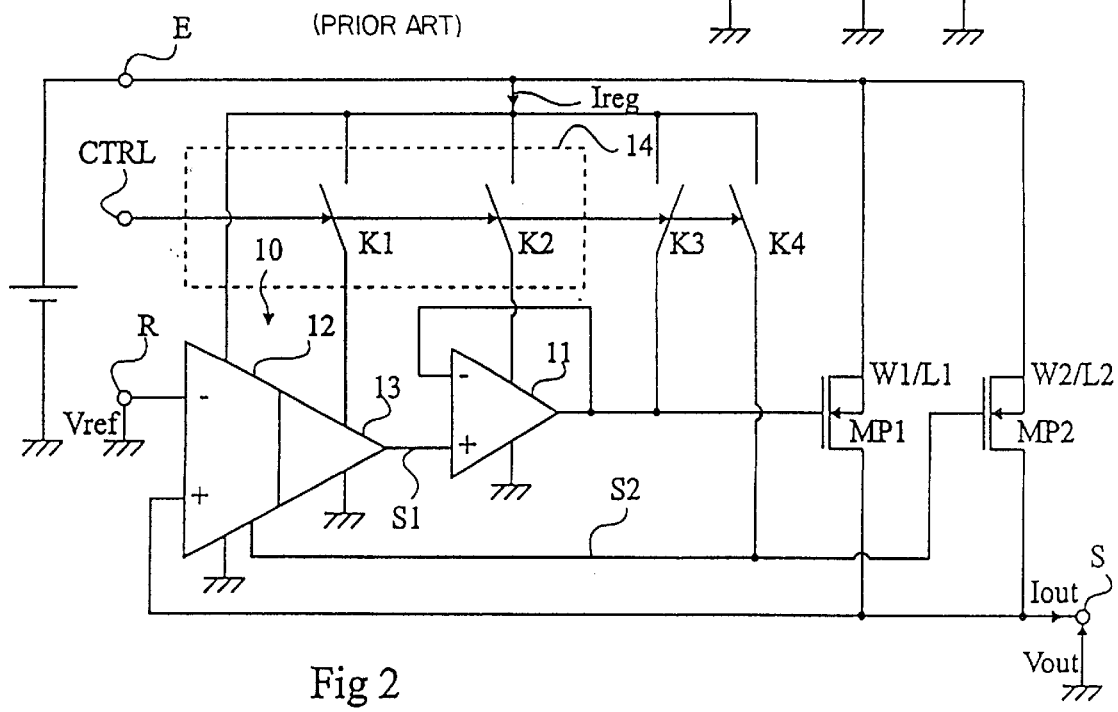
FIG. 2 shows an embodiment of a linear regulator according to the present invention.

FIG. 2 shows an embodiment of a linear regulator according to the present invention.

According to the present invention, the regulator includes at least two distinct controlled elements which supply a load (not shown in FIG. 2) under a predetermined voltage Vout. A first element is formed, for example, of a P-channel MOS power transistor MP1 connected between a terminal E for supplying the regulator and an output terminal S of the regulator. A second element is formed of a P-channel MOS power transistor MP2 of smaller size (W2/L2) than that (W1/L1) of transistor MP1, also connected between terminals E and S, and meant to supply the load during partial stand-by periods thereof. Each transistor MP1, MP2, is controlled individually through its gate by distinct means. In the embodiment shown in FIG. 2, the regulator includes an amplifier 10 for controlling output voltage Vout on a reference voltage Vref applied, through an input terminal R of the regulator, to an inverting input of amplifier 10. A non-inverting input of amplifier 10 is connected to terminal S, and thus to the drains of transistors MP1 and MP2. It should be noted that, conventionally, the reverse feedback on the non-inverting input of amplifier 10 can be performed via a resistive bridge (not shown) to introduce a coefficient of proportionality between voltages Vout and Vref. Voltage Vref is, for example, supplied by an external voltage source. It should however be noted that voltage Vref can also be formed by a cell integrated in the regulator.

Amplifier 10 includes two distinct outputs S1, S2, meant for transistors MP1, MP2. Output S1 is associated with a follower amplifier 11 of unity gain having an impedance adaptation function (high input impedance, low output impedance).

As an alternative implementation, amplifier 10 can be formed of two independent amplifiers each receiving voltages Vref and Vout and each associated with one of transistors MP1 and MP2.

It is however preferred to use a single amplifier 10 since a single input stage is then necessary, which enables reduction of the number of transistors of the regulator and thus its consumption. Similarly, although amplifier 10 can include two independent output stages, it will be preferred to implement it with a single output stage formed of at least two transistor branches in cascade, output S2 being taken on a first branch 12 and output S1 being taken on a second branch 13. Thus, the number of transistors is further minimized, the first branch meant for controlling transistor MP2 being also used to preamplify the error signal for the second branch meant for controlling transistor MP1.

An advantage of providing an impedance adapter 11 independent from amplifier 10 is that this makes amplifier 11 controllable independently from amplifier 10.

According to the present invention, the regulator also includes switching means K1, K2, K3, K4, for selecting the operating mode. The regulator includes a terminal CTRL of input of a logic control signal issued by the load and indicative of its operating mode. For example, in the case of a portable phone, this load has essentially two operating modes corresponding to periods of communication and periods of waiting for communication. In partial stand-by mode corresponding to the wait for a communication, the telephone circuits are at stand-by, except for a call detection unit. The consumption of this unit is very low (for example, from around 100 $\mu$A to 2 mA). When it receives or when it must transmit a call, the phone switches to the communication mode, corresponding to the full charge mode of the regulator which must then supply a current likely to vary from about one hundred $\mu$A to about 100 mA.

In the embodiment shown in FIG. 2, the regulator includes at least two switches K1 and K2 controlled simultaneously based on the signal present on terminal CTRL. A switch K1 is meant to cut off the biasing of output S1 of amplifier 10, that is, the biasing of the second branch 13 of transistors (not shown) of amplifier 10. A switch K2 is meant to control the biasing of follower amplifier 11. The input stage of amplifier 10 as well as the first output branch S2 meant for transistor MP2 are biased whatever the operating mode. In practice, the biasings of amplifiers 10 and 11 are performed via a biasing circuit 14 integrating switches K1, K2, and receiving the voltage of battery 4 and control signal CTRL.

Preferably, two switches K3 and K4, also controlled by signal CTRL, are interposed between terminal E and the respective gates of transistors MP1 and MP2 to block these transistors, and thus enable the choice of the transistor according to the operating mode.

The different switches K1 to K4 are, for example, implemented by means of MOS transistors.

In full charge mode, switches K1, K2, and K4 are closed and switch K3 is open. Thus, the control loop of voltage Vout on voltage Vref is carried out by the complete amplifier 10, amplifier 11, and MOS power transistor MP1.

In partial stand-by mode, switches K1, K2, and K4 are open and switch K3 is closed. The control loop of voltage Vout here only includes the first branch 12 (or the first output stage if branches 12 and 13 are replaced with two output stages) of amplifier 10 and transistor MP2.

An advantage of the present invention is that, in partial stand-by mode, the regulator power consumption is considerably reduced. This advantage is linked with the use of a MOS transistor MP2 distinct from MOS power transistor MP1. Due to the low intensity taken by the load in stand-by mode, transistor MP2 has a reduced dimension (W2/L2) and thus has a lower gate capacitance. Thus, branch 12 of control amplifier 10 can be simpler than in a conventional regulator, while being stable.

Figure 3:
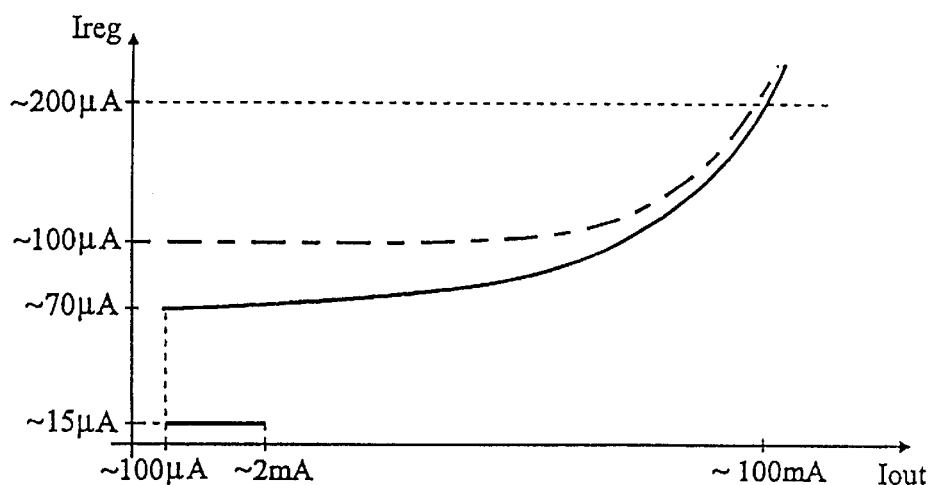
FIG. 3 is a diagram illustrating the consumption of the linear regulator of the present invention as a function of the current that it delivers.

FIG. 3 shows the current Ireg consumed by the regulator according to the current Iout of the load. This drawing corresponds to an example of application of the present invention to a portable phone and shows, for comparison, consumption the currents consumed by the two examples of conventional regulator described previously.

A conventional regulator such as shown in FIG. 1 has a permanent consumption of around 200 $\mu$A (curve in dotted lines). A conventional regulator having a self-biased control amplifier has a minimum current consumption of around 100 $\mu$A (curve in mixed lines).

The regulator according to the present invention (curve in full line) consumes, in stand-by mode, from around 10 to 20 $\mu$A (for example, 15 $\mu$A). In full charge mode, its characteristic is substantially similar to that of a self-biased control amplifier. It should however be noted that the minimum consumption in full charge mode is lower than that of such a conventional regulator and is, for example, around 70 $\mu$A. This is obtained thanks to follower amplifier 11 which insulates, in full charge mode, the gate capacitor of transistor MP1 from output S1 of control amplifier 10, which allows use of a simpler amplifier 10 and a self-biased amplifier 11.

According to the desired minimum consumption constraints, the complexity (the number of branches or stages) of control amplifier 10 and of follower amplifier 11 can be increased to minimize the switching noise linked to a possible switching overvoltage at the transition from the partial stand-by mode to the full charge mode.

An advantage of the present invention is that it considerably improves the charge hold of a battery meant to supply a load having two operating modes in which the current consumed by the load is substantially different in each of the operating modes. This advantage is particularly substantial in the case of a portable phone which is, generally, more than 80% of the time in partial stand-by mode, that is, waiting for a communication.

Another advantage of the present invention is that it is not prejudicial to the need for a low waste voltage between terminals E and S of the regulator, whatever its operating mode.

Of course, the present invention is likely to have various alterations, modifications, and improvements which will readily occur to those skilled in the art. In particular, although reference has been made in the foregoing description to a regulator having two operating modes, respectively a full charge mode and a partial stand-by mode, several distinct partial stand-by modes may be provided by multiplying the number of transistors MP2 and by interposing intermediary output stages or branches in amplifier 10. In this case, the biasing of each intermediary stage and of each additional transistor is controlled by means of a switch. Further, the practical implementation of the control amplifier and of the follower amplifier according to the present invention are within the abilities of those skilled in the art based on the functional indications given hereabove. Further, although the above-described example of implementation corresponds to a positive voltage regulator, the present invention also applies to the implementation of a negative voltage regulator and the modifications to be made to the regulator to obtain such a functionality are within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A linear regulator of a voltage for supplying a load, including:
    a first linear conduction element for supplying the load outside partial stand-by periods;
    at least one second linear conduction element for supplying the load during partial stand-by periods; and
    means for setting to partial stand-by the regulator in response to a control signal supplied by the load.

2. A regulator according to claim 1, wherein each conduction element is associated with a means for controlling the supply voltage of the load on a predetermined reference voltage.

3. A regulator according to claim 2, wherein each conduction element is formed of a MOS transistor, a first MOS power transistor associated with a full charge mode exhibiting a gate width/length ratio which is much higher than the gate width/length ratio of a second transistor.

4. A regulator according to claim 2 or 3, wherein the means for controlling the conduction elements are formed of a differential amplifier including, in cascade, an input differential stage receiving the reference voltage and the supply voltage of the load, a first output branch, a terminal of which is connected to a control terminal of the second conductive element, and a second output branch, a terminal of which is connected, via an impedance adapter, to a control terminal of the first conductive element.

5. A regulator according to claim 4, including switching means, controlled by the control signal supplied by the load, for biasing the second branch of the control amplifier and the impedance adapter associated with the first conductive element only during full charge periods.

6. A regulator according to claim 5, further including a switching means, associated with each conductive element and controlled by the control signal, for blocking one of the two conductive elements according to the operating mode.

7. A regulator according to claim 2 or 3, wherein the control means of the first conductive element is formed of a differential amplifier receiving the reference voltage and the supply voltage of the load and a first output stage of which is meant for the first conductive element.

8. A regulator according to claim 7, wherein the control means of the second conductive element is formed of the differential amplifier, a second output stage of which is meant for the second conductive element.

9. The linear regulator according to claim 1, wherein the first linear conduction element and the second linear conduction element are in parallel.

10. A method of regulating a voltage for supplying a load capable of operating in a plurality of modes including stand-by, comprising the steps of:

associating each mode with a linear conduction element that can supply the load;

determining the mode of the load;

selecting the linear conduction element associated with the mode; and activating the linear conduction element.

11. Apparatus for regulating a voltage of a load capable of operating in a plurality of modes including stand-by, comprising:

means for associating each mode with a linear conduction element that can supply the load;

means for determining the mode of the load;

means for selecting the linear conduction element associated with the mode; and means for activating the linear conduction element.

12. A linear regulator of a voltage comprising:

a battery with a first battery terminal and a second battery terminal;

a load with a first load terminal at the voltage and a second load terminal;

a first linear conduction element with input, output, and control terminals and a second linear conduction element with input, output, and control terminals wherein the input terminal are connected to the first battery terminal and the output terminals are connected to the first load terminal;

a first amplifier with first amplifier input connections to a reference voltage and to the first load terminal, first amplifier output connection to the control element of the second linear conduction element, and connection to the first terminal of the battery;

a second amplifier with second amplifier input connection to the first amplifier and a second amplifier output connection an impedance transformer with input connected to the second amplifier output and with output connected to the control element of the first linear conduction element;

a set of switches controlled by the mode of the load and connecting the first battery terminal to the second amplifier, the impedance adapter, the control terminal of the first linear conduction element, the control element of the second linear conduction element.

* * * * *